UNITED STATES PATENT OFFICE.

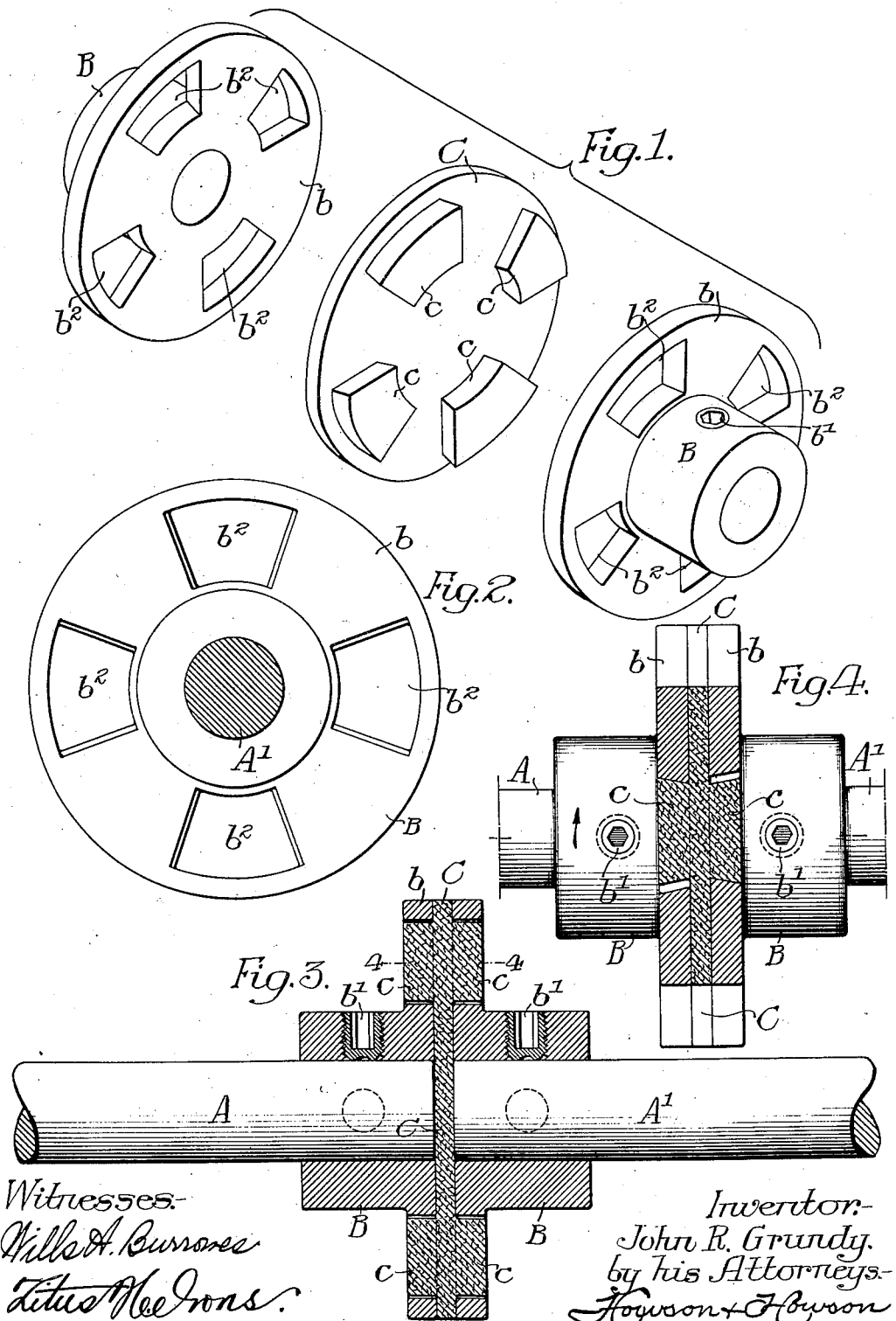

JOHN R. GRUNDY, OF PHILADELPHIA, PENNSYLVANIA, ASSIGNOR TO THE CHARLES BOND COMPANY, OF PHILADELPHIA, PENNSYLVANIA, A CORPORATION OF PENNSYLVANIA.

INSULATING SHAFT-COUPLING.

939,829.

Specification of Letters Patent.

Patented Nov. 9, 1909.

Application filed March 29, 1909. Serial No. 486,515.

*To all whom it may concern:*

Be it known that I, JOHN R. GRUNDY, a citizen of the United States, residing in Philadelphia, Pennsylvania, have invented certain Improvements in Insulating Shaft-Couplings, of which the following is a specification.

One object of my invention is to provide a novel form of structure for flexibly connecting two shafts, which while being constructed of material electrically insulating said shafts, shall have its parts so formed and arranged as to be capable of transmitting the desired amount of power from one to the other.

I also desire to provide a flexible insulating coupling of such construction that while power is being transmitted from one shaft to the other, there shall be a positive force exerted to draw the ends of the shafts together and thereby reduce the likelihood of injury to the coupling due to sudden changes in the amount of power transmitted.

It is further desired to provide a flexible insulating shaft coupling, which while being capable of satisfactorily performing the functions of such a device, shall be capable of permitting separation of the ends of the shafts without requiring expenditure of more than a merely nominal amount of time and labor for this purpose.

These objects and other advantageous ends I secure as hereinafter set forth, reference being had to the accompanying drawings in which:—

Figure 1, is a detached perspective view of the coupling constituting my invention; Fig. 2, is an end elevation of one of the members of the coupling, the supporting shaft being shown in section; Fig. 3, is a vertical section of my improved shaft coupling, further illustrating its construction; and Fig. 4, is a horizontal section on the line 4—4, Fig. 3.

In the above drawings A and A' represent two shafts which it is desired to couple, and each of them is provided with a hub B having a flange $b$. Said hubs are rigidly fastened to their respective shafts by set screws $b'$.

Each of the flanged portions $b$ is provided with a number of apertures $b^2$, of which in the present instance there are four in each of the members $h$. These apertures are preferably arranged equidistant from the center of the flange and their radial sides are inclined as shown best in Fig. 4;— that is to say, the area of the opening of each aperture on the outer face of each flange is less than the area of its opening on the inner face, and the radially placed sides of the said aperture are flared outwardly from said front faces to the rear faces of the flange.

For transmitting power between the two flanged hubs B, I employ a disk C of leather, raw hide, fabric, or other suitable flexible electrically insulating material, and provide each face of this disk with a number of projections or lugs $c$ of such size and so spaced as to be capable of entering the apertures or recesses $b^2$ in the flanges $b$ of the hubs B. The two radial sides of each of the lugs are undercut, so that the lug is dovetailed in section, their inclinations being preferably the same as those of the radial sides of the apertures in the flanges. As a result, when the two flanged hubs are mounted on adjacent ends of two shafts which are substantially in line with each other and the insulating disk C is mounted between them, with its lugs or projections entering the openings $b^2$ of the flanges, power may be transmitted from one shaft to the other. Moreover, owing to the inclinations of the sides of the apertures in the flanges and to the undercutting of the sides of the lugs $c$ there is under operating conditions a positive tendency to draw the two flanges together so that their faces are tightly pressed against the faces of the disk C, with the result that power is transmitted not only through the lugs or projections, but also directly from the faces of the flanged hubs through the body of the insulating disk C.

While in some instances the projections $c$ may be formed integral with the body of the insulating disk C, it is obvious that they may be formed separate therefrom and rigidly held in position by any suitable means, such as clamps, rivets, or the like.

It will be understood that the dimensions of the projections as well as their number and position may be varied in accordance with the amount of power to be transmitted.

It is to be noted that the construction of my coupling is such that it provides a flexible connection between the two shafts which it joins, thereby making possible the satisfactory operation of said shafts even though they are out of alinement.

I claim as my invention:

1. The combination of two shafts, a flanged hub mounted on each shaft, an insulating disk between said hubs, a series of segmental projections on each face of said disk each having radial undercut sides, there being recesses having undercut sides in each of the flanges.

2. The combination of two shafts, a flange fixed to each shaft and each having a recess or recesses, with a disk of insulating material mounted between said flanges and having projections on opposite faces in line with each other and entering the recess or recesses of the flanges.

3. The combination of two shafts, a flange mounted on each shaft, a disk of insulating material mounted between the flanges, and means for connecting said disk and flanges, the same consisting of two series of projections having undercut sides and mounted on opposite faces of said disk, the projections of one series being respectively in line with those of the other series and fitting recesses formed with inclined sides in the flanges.

4. The combination of two shafts, each having fixed to it a flange, each flange having a series of openings provided with inclined sides, with a disk of insulating material mounted between the flanges and provided on each face with a series of projections, the projections being capable of entering the openings in the flanges and having their sides undercut.

In testimony whereof, I have signed my name to this specification, in the presence of two subscribing witnesses.

JOHN R. GRUNDY.

Witnesses:
Wm. A. Barr,
Jos. H. Klein.